United States Patent
Bai et al.

(10) Patent No.: US 12,317,277 B2
(45) Date of Patent: May 27, 2025

(54) EFFICIENT REPORT CONFIGURATION FOR REMOTE DEVICES

(71) Applicant: QUALCOMM Incorporated, San Diego, CA (US)

(72) Inventors: Tianyang Bai, Somerville, NJ (US); Hua Wang, Basking Ridge, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 458 days.

(21) Appl. No.: 17/654,013

(22) Filed: Mar. 8, 2022

(65) Prior Publication Data

US 2023/0292325 A1    Sep. 14, 2023

(51) Int. Cl.
*H04W 72/23*    (2023.01)
*H04L 5/00*    (2006.01)
*H04W 72/1268*    (2023.01)

(52) U.S. Cl.
CPC ........... *H04W 72/23* (2023.01); *H04L 5/0055* (2013.01); *H04W 72/1268* (2013.01)

(58) Field of Classification Search
CPC .. H04W 72/23; H04W 72/1268; H04L 5/0055
See application file for complete search history.

(56) References Cited

U.S. PATENT DOCUMENTS

| | | | | |
|---|---|---|---|---|
| 8,559,384 | B2 * | 10/2013 | Yamada | H04L 5/0037 370/348 |
| 10,225,826 | B2 * | 3/2019 | Tiirola | H04B 1/713 |
| 10,601,567 | B2 * | 3/2020 | Marinier | H04L 1/0028 |
| 10,869,272 | B2 * | 12/2020 | Shu | H04W 52/0235 |
| 2017/0251492 | A1 * | 8/2017 | Andersson | H04W 72/23 |
| 2019/0380154 | A1 * | 12/2019 | Wei | H04W 74/0833 |
| 2020/0314814 | A1 * | 10/2020 | Baek | H04W 72/569 |
| 2023/0189050 | A1 * | 6/2023 | Rao | H04L 47/283 370/231 |
| 2023/0292325 | A1 * | 9/2023 | Bai | H04L 5/0055 |

* cited by examiner

*Primary Examiner* — Raj Jain
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of a first resource grant, the first resource grant being a periodic resource grant. The UE may transmit a first portion of information based at least in part on the first resource grant. The UE may receive a first request for a second portion of the information. The UE may transmit the second portion of the information based at least in part on a second resource grant that is received without transmitting a second request for the second resource grant, the second resource grant being different from the first resource grant. Numerous other aspects are described.

30 Claims, 10 Drawing Sheets

EFFICIENT REPORT CONFIGURATION FOR REMOTE DEVICES

FIELD OF THE DISCLOSURE

Aspects of the present disclosure generally relate to wireless communication and to techniques and apparatuses for efficient report configuration for remote devices.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an indication of a first resource grant, the first resource grant being a periodic resource grant. The method may include transmitting a first portion of information based at least in part on the first resource grant. The method may include receiving a first request for a second portion of the information. The method may include transmitting the second portion of the information based at least in part on a second resource grant that is received without transmitting a second request for the second resource grant, the second resource grant being different from the first resource grant.

Some aspects described herein relate to a method of wireless communication performed by a network entity. The method may include transmitting an indication of a first resource grant, the first resource grant being a periodic resource grant. The method may include receiving a first portion of information based at least in part on the first resource grant. The method may include transmitting a first request for a second portion of the information. The method may include receiving the second portion of the information based at least in part on a second resource grant that is transmitted without receiving a second request for the second resource grant, the second resource grant being different from the first resource grant.

Some aspects described herein relate to a non-transitory computer-readable medium that stores a set of instructions for wireless communication by a UE. The set of instructions, when executed by one or more processors of the UE, may cause the UE to receive an indication of a first resource grant, the first resource grant being a periodic resource grant. The set of instructions, when executed by one or more processors of the UE, may cause the UE to transmit a first portion of information based at least in part on the first resource grant. The set of instructions, when executed by one or more processors of the UE, may cause the UE to receive a first request for a second portion of the information. The set of instructions, when executed by one or more processors of the UE, may cause the UE to transmit the second portion of the information based at least in part on a second resource grant that is received without transmitting a second request for the second resource grant, the second resource grant being different from the first resource grant.

Some aspects described herein relate to a non-transitory computer-readable medium that stores a set of instructions for wireless communication by a network entity. The set of instructions, when executed by one or more processors of the network entity, may cause the network entity to transmit an indication of a first resource grant, the first resource grant being a periodic resource grant. The set of instructions, when executed by one or more processors of the network entity, may cause the network entity to receive a first portion of information based at least in part on the first resource grant. The set of instructions, when executed by one or more processors of the network entity, may cause the network entity to transmit a first request for a second portion of the information. The set of instructions, when executed by one or more processors of the network entity, may cause the network entity to receive the second portion of the information based at least in part on a second resource grant that is transmitted without receiving a second request for the second resource grant, the second resource grant being different from the first resource grant.

Some aspects described herein relate to an apparatus for wireless communication. The apparatus may include means for receiving an indication of a first resource grant, the first resource grant being a periodic resource grant. The apparatus may include means for transmitting a first portion of information based at least in part on the first resource grant. The apparatus may include means for receiving a first request for a second portion of the information. The apparatus may include means for transmitting the second portion of the information based at least in part on a second resource grant that is received without transmitting a second request for the second resource grant, the second resource grant being different from the first resource grant.

Some aspects described herein relate to an apparatus for wireless communication. The apparatus may include means for transmitting an indication of a first resource grant, the first resource grant being a periodic resource grant. The apparatus may include means for receiving a first portion of information based at least in part on the first resource grant. The apparatus may include means for transmitting a first request for a second portion of the information. The apparatus may include means for receiving the second portion of the information based at least in part on a second resource grant that is transmitted without receiving a second request for the second resource grant, the second resource grant being different from the first resource grant.

Some aspects described herein relate to an apparatus for wireless communication at a UE. The apparatus may include a memory and one or more processors coupled to the memory. The one or more processors may be configured to receive an indication of a first resource grant, the first resource grant being a periodic resource grant. The one or more processors may be configured to transmit a first portion of information based at least in part on the first resource grant. The one or more processors may be configured to receive a first request for a second portion of the information. The one or more processors may be configured to transmit the second portion of the information based at least in part on a second resource grant that is received without transmitting a second request for the second resource grant, the second resource grant being different from the first resource grant.

Some aspects described herein relate to an apparatus for wireless communication at a network entity. The apparatus may include a memory and one or more processors coupled to the memory. The one or more processors may be configured to transmit an indication of a first resource grant, the first resource grant being a periodic resource grant. The one or more processors may be configured to receive a first portion of information based at least in part on the first resource grant. The one or more processors may be configured to transmit a first request for a second portion of the information. The one or more processors may be configured to receive the second portion of the information based at least in part on a second resource grant that is transmitted without receiving a second request for the second resource grant, the second resource grant being different from the first resource grant.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
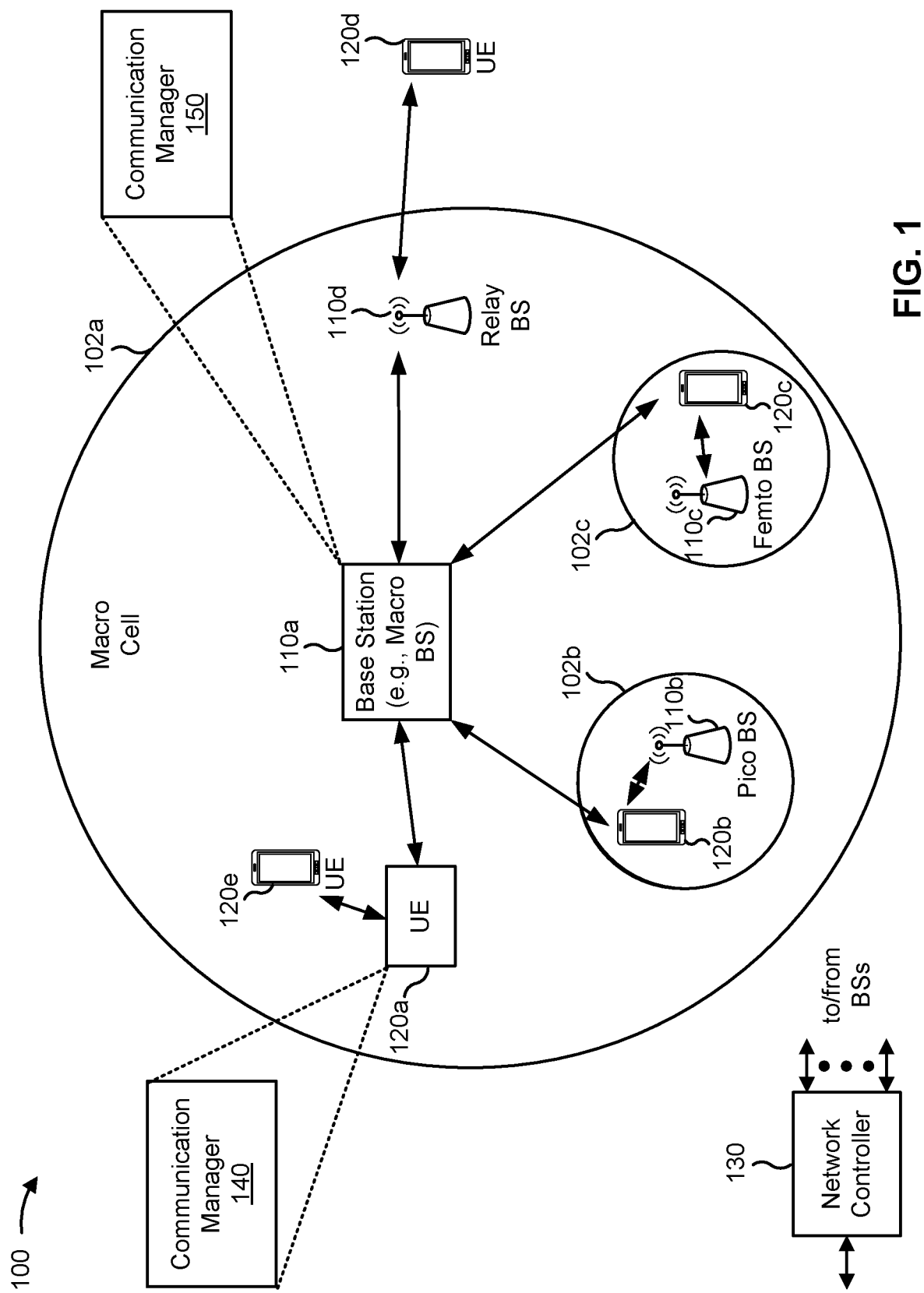
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an indication of a first resource grant, the first resource grant being a periodic resource grant; transmit a first portion of information based at least in part on the first resource grant; receive a first request for a second portion of the information; and transmit the second portion of the information based at least in part on a second resource grant that is received without transmitting a second request for the second resource grant, the second resource grant being different from the first resource grant. Additionally, or alternatively, the communication manager 140 may perform one or more other operations described herein.

In some aspects, the network entity may include a communication manager 150. As described in more detail elsewhere herein, the communication manager 150 may transmit an indication of a first resource grant, the first resource grant being a periodic resource grant; receive a first portion of information based at least in part on the first resource grant; transmit a first request for a second portion of the information; and receive the second portion of the information based at least in part on a second resource grant that is transmitted without receiving a second request for the second resource grant, the second resource grant being different from the first resource grant. Additionally, or alternatively, the communication manager 150 may perform one or more other operations described herein.

As indicated above, FIG. 1 is provided as an example. Other examples may differ from what is described with regard to FIG. 1.

Figure 2:
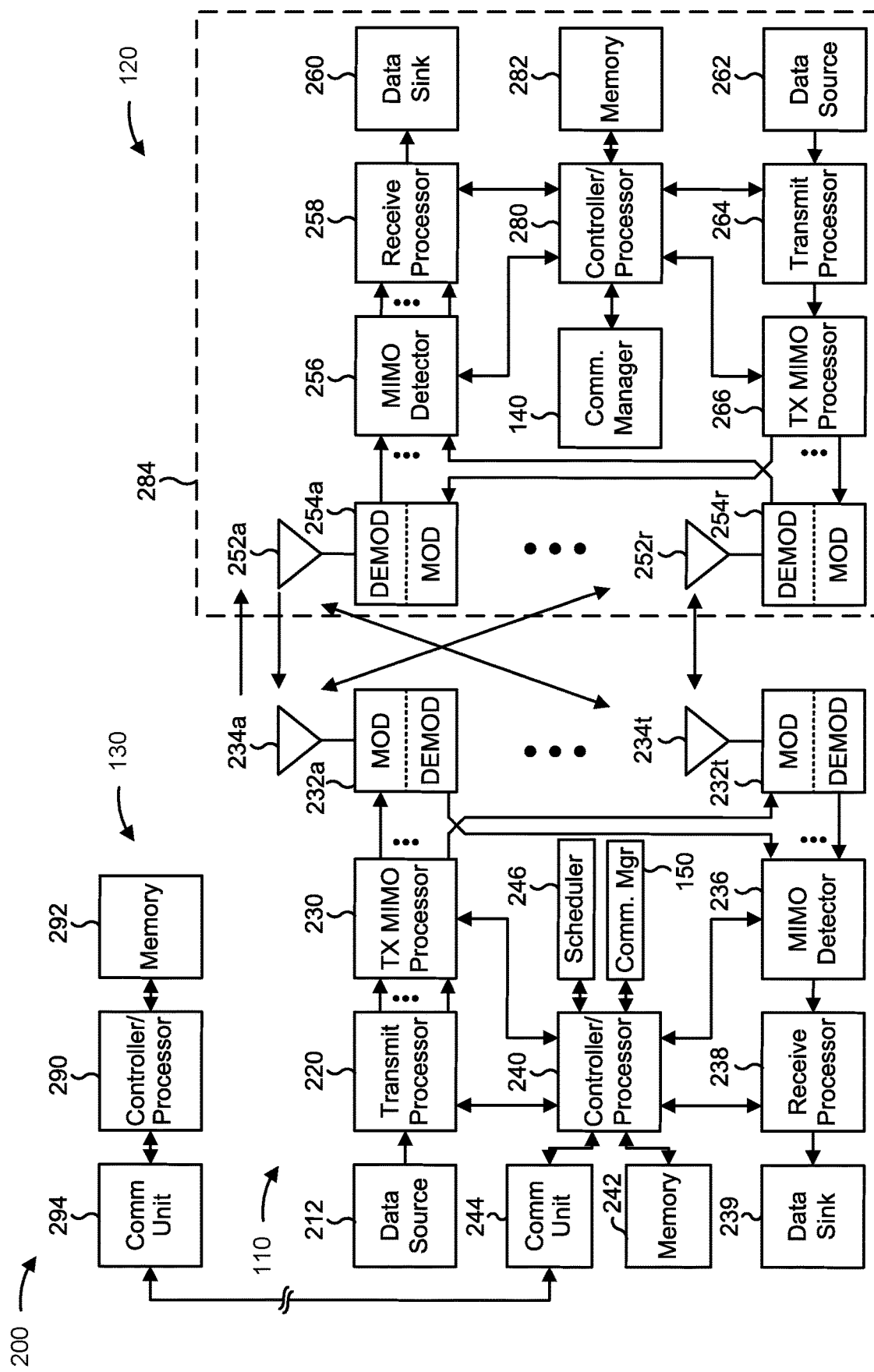
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the base station 110, the controller/processor 280 of the UE 120, and/or any other component(s) of FIG. 2 may perform one or more techniques associated with efficient reporting for remote devices, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE includes means for receiving an indication of a first resource grant, the first resource grant being a periodic resource grant; means for transmitting a first portion of information based at least in part on the first resource grant; means for receiving a first request for a second portion of the information; and/or means for transmitting the second portion of the information based at least in part on a second resource grant that is received without transmitting a second request for the second resource grant, the second resource grant being different from the first resource grant. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity includes means for transmitting an indication of a first resource grant, the first resource grant being a periodic resource grant; means for receiving a first portion of information based at least in part on the first resource grant; means for transmitting a first request for a second portion of the information; and/or means for receiving the second portion of the information based at least in part on a second resource grant that is transmitted without receiving a second request for the second resource grant, the second resource grant being different from the first resource grant. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the network entity to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

The number of devices that include wireless capabilities continues to increase over time. As one example, an edge computing device, such as an Internet of Things (IoT) device, may include wireless capabilities for communicating with another device, such as via a cellular network, a wireless local network (WLAN), Bluetooth™, and/or WiFi. In some aspects, the edge computing device may include a sensor (e.g., a camera, an audio sensor, and/or a motion sensor) that captures information about a surrounding area. The edge computing device may then use wireless capabilities to transmit the information to a central server and/or application running at the central server. As one example, the edge computing device may periodically transmit sensor output (e.g., audio and/or video) information to the central server.

While edge computing devices may be useful in providing information to the central server, the availability of air interface resources (e.g., frequency and/or time resources) for communicating over the wireless network may decrease as the number of devices accessing the wireless network increases. To illustrate, a wireless network may share the available air interface resources between each device such that, as the number of devices increases, the allocation of air interface resources to each device decreases. In some aspects, a device (e.g., an edge computing device) may periodically transmit information using the wireless network system. The decreased availability of air interface resources may reduce data throughput, increase data transfer latencies, and/or reduce a quantity of devices supportable by a wireless communication network. In some scenarios, scheduling transmissions for periodic transmissions may consume additional air interface resources and introduce time delays, as further described with regard to FIG. 3.

Figure 3:
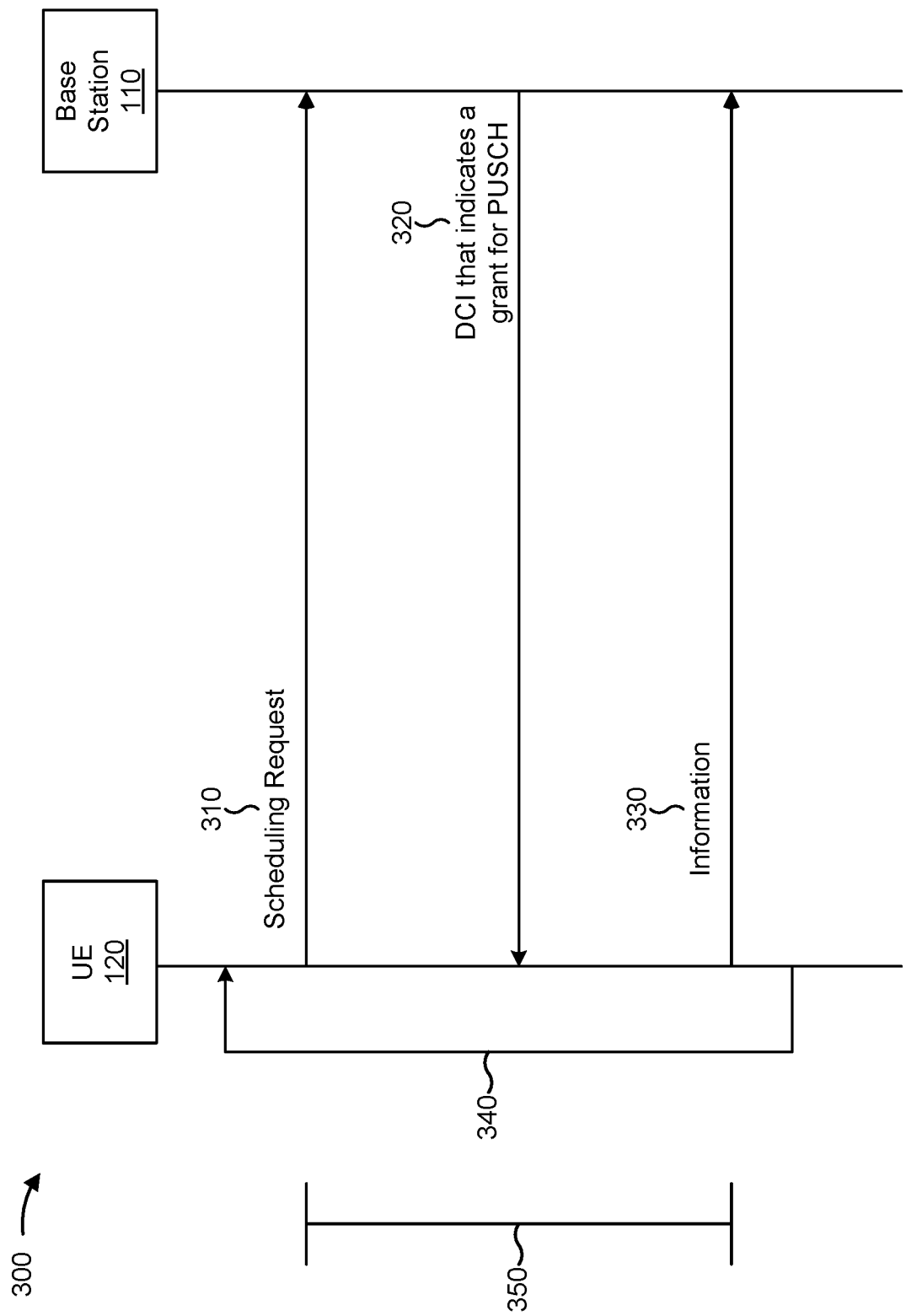
FIG. 3 is a diagram illustrating an example of a baseline communication process between a base station and a UE in a wireless network.

FIG. 3 is a diagram illustrating an example 300 of a baseline communication process between a base station 110 and a UE 120 in a wireless network 100. The UE 120 may be considered an edge computing device. In some aspects, exchanges shown by the example 300 may be performed iteratively and/or repeatedly by the UE 120 and the base station 110.

As shown by reference number 310, the UE 120 may transmit, and the base station 110 may receive, a scheduling request (SR). As one example, the UE 120 may periodically and/or continuously collect information about an area surrounding the UE 120 using one or more sensors. For example, the UE 120 may collect image data and/or audio data using a camera and/or microphone. In some aspects, the UE 120 may transmit the SR to request a dynamic resource grant (e.g., a one-time grant) for transmitting the information via the wireless network. A dynamic resource grant is a grant of resources that is communicated using dynamic signaling, such as via a downlink control information message. As one example, a dynamic uplink resource grant is a grant of resources for uplink communications from the UE to a network entity.

As shown by reference number 320, the base station 110 may transmit, and the UE 120 may receive, downlink control information (DCI) that indicates a dynamic resource grant for a physical uplink shared channel (PUSCH). For example, the dynamic resource grant may specify air interface resources associated with the PUSCH that the base station 120 has assigned to the UE 120 for one or more uplink transmission(s).

As shown by reference number 330, the UE 120 may transmit, and the base station 110 may receive, information based at least in part on the dynamic resource grant received from the base station 110. The UE 120 may transmit any form or type of information, such as data generated by one or more sensors (e.g., still image, audio, video), a header that describes the data (e.g., a time stamp, location information), one or more metrics associated with the information (e.g., a maximum audio power level, a detected object location, a detected object velocity), processed information (e.g., compressed data), and/or information about the UE 120 (e.g., a UE identifier, a UE location).

As shown by reference number 340, the UE 120 and the base station 110 may iteratively perform the operations shown by the example 300. To illustrate, the UE 120 may transmit, and the base station 110 may receive, an SR each time the UE 120 gathers and/or stores information to transmit to the base station 110. The base station 110 may transmit, and the UE 120 may receive, a dynamic resource grant (e.g., a dynamic uplink resource grant) based at least in part on each SR transmitted by the UE 120. The UE 120 may then transmit, and the base station 110 may receive, the information based at least in part on the grant shown by the reference number 320.

The baseline communication process as shown by the example 300 may introduce inefficiencies that consume air interface resources and/or that delay transfer of information between the UE 120 and the base station 110. As one example, a size of the information generated and/or collected by UE 120 may exceed a size of information able to be transmitted using the resources granted by the dynamic resource grant received from the base station 110, thus causing the UE 120 to request an additional dynamic resource grant that uses additional air interface resources. As another example, the UE 120 may transmit information that the base station 110 discards without using, thus wasting the air interface resources. To illustrate, the UE 120 may transmit repetitive information and/or information that the base station 110 defines as dispensable, such as surveillance video images that reflect no change from prior images (e.g., no new objects detected, no potential threats detected). Transmitting dispensable and/or repetitive information may waste air interface resources that might be allocated to other devices for other communications.

As yet another example, the UE 120 may incur a time delay 350 between transmitting the SR to the base station 110 as shown by the reference number 310 and transmitting the information to the base station as shown by the reference number 330. The time delay 350 may adversely affect the transmission of time-sensitive information and render the time-sensitive information useless. Thus, the inefficiencies of the baseline communication process shown by the example 300 may consume additional air interface resources that could be otherwise allocated to other devices and/or may introduce time delays, which may reduce data throughput, increase data transfer latencies, and/or reduce a quantity of devices supportable by the wireless network.

Some techniques and apparatuses described herein provide efficient report configuration for remote devices. A UE (e.g., the UE 120, an edge computing device, and/or the apparatus 900) may receive a first resource grant from a network entity, where the first resource grant is a periodic resource grant and/or a configured grant (CG).

The UE may gather information, such as sensor data, and analyze the information to generate one or more metrics associated with the information to transmit to the network entity. As one example, the UE may analyze the sensor data using an algorithm to detect information defined as being of interest, such as a definition that defines one or more anomalies in the sensor data (e.g., a change in current sensor data relative to prior sensor data that exceeds a percentage threshold, a sound that exceeds a sound threshold level, a light that exceeds an intensity level, and/or a detected object velocity that exceeds a velocity threshold) and/or a definition that defines a detected object of interest (e.g., a detected object that was undetected in prior sensor data). In some aspects, the network entity and/or a server in communication with the network entity may indicate, to the UE, one or more definitions for information of interest (e.g., target information). Alternatively or additionally, the UE may include or store programming that specifies one or more definitions for information of interest.

As part of the information, the UE may generate a first metric that indicates that the sensor data includes an anomaly and/or that an object was detected based at least in part on analyzing the sensor data. Alternatively, the UE may generate a second metric that indicates that the sensor data lacks an anomaly and/or that no object was detected based at least in part on analyzing the sensor data. The UE may then transmit a portion of the information (e.g., one or more metrics generated by analyzing the sensor data) to the network entity using the first resource grant (e.g., an instance of the configured grant).

By using the first resource grant, the UE may transmit the first portion of the information to the network entity without incurring a time delay associated with waiting for a dynamic resource grant (e.g., the time delay 350) and improve data-transfer latencies. By transmitting a portion of the information, the UE may also utilize fewer air interface resources relative to other communication processes (e.g., the baseline communication process shown by the example 300), and preserve the air interface resources for other devices. To illustrate, a 1-bit indication associated with a metric may use fewer air interface resources relative to a video clip that includes 10 seconds of video and audio data.

In some aspects, the UE may receive a request from the network entity for a second portion of the information. As one example, based at least in part on the UE transmitting an indication that the UE has identified information of interest, the UE may receive a request to transmit a second portion of the information, such as the sensor data, to the network entity. The UE may then transmit the second portion of the information using a second resource grant received from the network entity without the UE transmitting a request for the second resource grant. To illustrate, and as further described with regard to FIG. 4, the network entity may transmit, in DCI, a first acknowledge indication associated with the first portion of the information transmitted by the UE and, in the same DCI, a second indication of the second resource grant. As another example, the network entity may transmit the second resource grant together with the first resource grant as further described with regard to FIG. 5. In some aspects, the second resource grant is different from the first resource grant.

In some aspects, the acknowledge indication implicitly instructs the UE 120 to transmit the second portion of information. By receiving the second resource grant without transmitting a request for the resource grant, and by receiving the implicit instructions to transmit the second portion of information, the UE 120 may transmit the second portion of information without incurring a time delay associated with requesting and waiting for the resource grant, which may reduce data-transfer latencies. The acknowledge indication and the second resource grant may also preserve air interface resources of the wireless network. For example, the UE 120 may refrain from transmitting the second portion of information to the base station 110 based at least in part on not receiving the acknowledge indication, thus preserving the air interface resources for other devices operating in the wireless network. Assigning the preserved air interface resources to other devices may help improve data throughput in the wireless network, may reduce other data-transfer latencies in the wireless network, and/or may increase a quantity of devices supportable by the wireless network. Refraining from transmitting the second portion of information may also preserve a battery life of the UE 120 by reducing power consumed by the UE.

In some aspects, a UE (e.g., the UE 120) receives an indication of a first resource grant for wireless transmissions, where the first resource grant is a periodic resource grant. The UE may then transmit a first portion of information based at least in part on the first resource grant. In some aspects, the UE may receive a first request for a second portion of the information. The UE may then transmit at least the second portion of the information based at least in part on a second resource grant received without the UE transmitting a second request for the second resource grant, where the second resource grant is different from the first resource grant.

In some aspects, a network entity (e.g., the base station 110) transmits an indication of a first resource grant for wireless transmissions, where the first resource grant is a periodic resource grant. As one example, a network entity may receive instructions from a central server and/or application to configure a UE with a periodic resource grant and then transmit the first resource grant to the UE (e.g., either directly or indirectly through other network entities). In some aspects, the network entity receives a first portion of information based at least in part on the first resource grant.

To illustrate, the network entity may receive one or more metrics, UE information, location information, and/or time stamps. The network entity may transmit a first request for a second portion of the information (e.g., either directly to the UE or indirectly to the UE through other network entities). In some aspects, the network entity transmits the first request for a second portion of the information based at least in part on receiving instructions from the central server and/or application to request at least the second portion of information. The network entity may receive at least the second portion of the information based at least in part on a second resource grant transmitted and/or assigned to the UE without receiving a second request for the second resource grant from the UE (e.g., directly or indirectly).

As indicated above, FIG. 3 is provided as an example. Other examples may differ from what is described with regard to FIG. 3.

Figure 4:
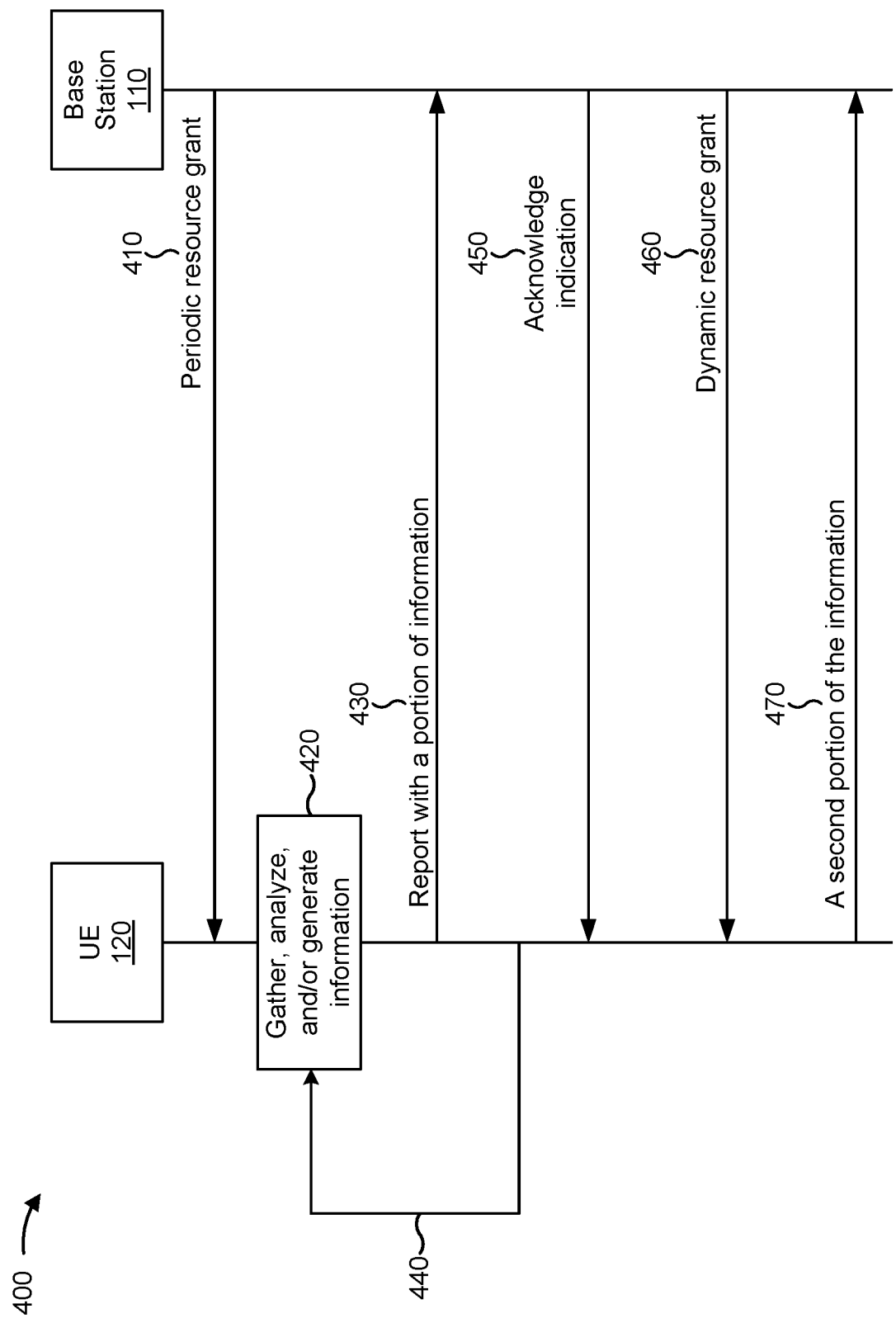
FIG. 4 is a diagram illustrating an example of a communication process between a base station and a UE in a wireless network, in accordance with the present disclosure.

FIG. 4 is a diagram illustrating an example 400 of a communication process between a base station 110 and a UE 120 in a wireless network 100, in accordance with the present disclosure. While the example 400 shows the base station 110 participating in the communication process, alternate or additional network entities may participate, such as a radio unit, a distributed unit, and/or a central unit of a distributed base station.

As shown by reference number 410, the base station 110 may transmit, and the UE 120 may receive, a first resource grant. The first resource grant may be a periodic and/or a configured grant. In some aspects, a periodic and/or configured grant may include periodic uplink communications that are configured for a UE, such that a network entity does not need to send separate DCI to schedule each uplink communication, thereby conserving signaling overhead. A CG configuration may indicate a resource allocation associated with CG uplink communications (e.g., in a time domain, frequency domain, spatial domain, and/or code domain) and a periodicity at which the resource allocation is repeated, resulting in periodically reoccurring scheduled CG occasions. In some examples, the CG configuration may identify a resource pool or multiple resource pools that are available to the UE for an uplink transmission. The CG configuration may configure contention-free CG communications (e.g., where resources are dedicated for the UE to transmit uplink communications) or contention-based CG communications (e.g., where the UE contends for access to a channel in the configured resource allocation, such as by using a channel access procedure or a channel sensing procedure).

As one example, the base station 110 may transmit, as the resource grant, a configured grant (CG)-PUSCH configuration to the UE 120. In some aspects, the base station 110 may transmit the first resource grant (e.g., a CG-PUSCH configuration) in a radio resource control (RRC) message, such as an RRC configuration message or an RRC reconfiguration message. The base station 110 may transmit the first resource grant based at least in part on receiving instructions from a central unit, central server and/or an application executing at the central unit and/or server as further described with regard to FIG. 6. For example, the UE 120 may be an edge computing device associated with a system managed by the central server and/or application. The central server may send instructions to the base station 110 that indicate to configure the UE 120 with the first resource grant. As another example, the base station 110 may transmit the first resource grant based at least in part on receiving an indication that the UE 120 has an association with the central server. To illustrate, the UE 120 may transmit capability information to the base station 110, such as during a registration process, where the capability information includes an indication of the association. Based at least in part on receiving the indication, the base station 110 may transmit the first resource grant to the UE 120.

As shown by reference number 420, the UE 120 may gather, analyze, and/or generate information. To illustrate, the UE 120 may gather sensor data and analyze the sensor data using one or more algorithms and/or models (e.g., a machine learning algorithm and/or a machine learning model). Machine learning involves computers learning from data to perform tasks. Machine learning algorithms are used to train machine learning models based on sample data, known as "training data." Once trained, machine learning models may be used to make predictions, decisions, or classifications relating to new observations. Machine learning algorithms may be used to train machine learning models for a wide variety of applications, including computer vision, natural language processing, financial applications, medical diagnosis, and/or information retrieval, among many other examples. In some aspects, the UE 120 may use a TinyML to analyze the sensor data, where a TinyML may be considered a machine learning algorithm and/or a model trained by a machine learning algorithm that has been optimized (e.g., a reduced memory size, reduced processing instructions) based at least in part on an associated hardware size, memory size, and/or central processing unit (CPU) processing power of a device executing the machine learning algorithm and/or model.

As part of analyzing the sensor data, the UE may generate one or more metrics associated with the sensor data, such as, by way of example and not of limitation, a first metric that indicates that the sensor data includes an anomaly or a detected object, a second metric that indicates that the sensor data lacks an anomaly or detected object, a third metric that indicates a power level (e.g., an audio power level of a sound captured by the sensor data), and/or a fourth metric that indicates an object velocity (e.g., a velocity of a detected object captured by a video). The UE 120 may generate the one or more metrics based at least in part on a definition for information of interest, as described elsewhere herein.

As shown by reference number 430, the UE 120 may transmit, and the base station 110 may receive, a report that includes a portion of the information (e.g., less than all of the information). For example, the UE 120 may transmit one or more metrics, a header, location information, processed information (e.g., compressed data), and/or UE information. In some aspects, the UE 120 may transmit the report and/or the portion of the information based at least in part on identifying that one or more reporting criteria are satisfied, such as a reporting criteria associated with detecting an anomaly and/or a reporting criteria associated with detecting an object. To illustrate, the UE 120 may transmit the report based at least in part on detecting an anomaly in the sensor data. Alternatively, the UE 120 may refrain from transmitting the report (e.g., may suppress transmission of the report) based at least in part on not detecting an anomaly in the sensor data (e.g., based at least in part on detecting that the sensor data does not include an anomaly). In some aspects, the UE 120 may periodically transmit the report independent of satisfying reporting criteria. While not shown in FIG. 4, the base station 110 may forward the portion of information to a central server and/or application, as further described with regard to FIG. 6.

As shown by reference number 440, the UE 120 may iteratively gather, analyze, and/or generate information and transmit a portion of the information to the base station. To illustrate, the UE 120 may gather, analyze, and/or generate information periodically and/or based at least in part on a periodicity associated with the first resource grant. Thus, the UE 120 may be configured to transmit periodic reports that include a portion of the information based at least in part on the resource grant shown by the reference number 410.

As shown by reference number 450, the base station 110 may transmit, and the UE 120 may receive, an acknowledge indication associated with the portion of the information transmitted by the UE 120 (e.g., an instance of a periodic report). Further, as shown by reference number 460, the base station 110 may transmit, and the UE 120 may receive, a dynamic resource grant. While the example 400 shows the acknowledge indication and the dynamic resource grant as being transmitted by the base station 110 and received by the UE 120 in separate transmissions, in some aspects, the base station 110 may transmit the acknowledge indication and the dynamic resource grant in a same transmission. For example, the base station 110 may transmit the acknowledge indication in DCI that indicates the dynamic resource grant, such as by toggling a bit value in a bit field of the DCI from a first value (e.g., "0") to a second value (e.g., "1") as the acknowledge indication.

In some aspects, the acknowledge indication and/or the dynamic resource grant may implicitly request that the UE 120 transmit a second portion of the information. As one example, the base station 120 may transmit the acknowledge indication to implicitly request that the UE 120 transmit a second portion of the information. An implicit request denotes information without an explicit field and/or value associated with the request. For example, an acknowledge indication may have a bit value explicitly associated with acknowledging receipt of the report as shown by the reference number 430. The bit value, however, may not have an explicit association with requesting the second portion of the information. In some aspects, the receipt of the acknowledge indication may implicitly request the second portion of the information. In some aspects, however, the base station 120 may transmit an indication with an explicit association with requesting the second portion of information (e.g., with the acknowledge indication, with the dynamic resource grant, and/or in a separate transmission).

In some aspects, the base station 110 may transmit the dynamic resource grant to implicitly request that the UE 120 transmit the second portion of information. For example, although not shown in FIG. 4, the base station 110 may transmit the acknowledge indication as part of the iterative process shown by the reference number 440. To request the second portion of the information, the base station 110 may transmit the dynamic resource grant.

As shown by reference number 470, the UE 120 may transmit, and the base station 110 may receive, a second portion of the information, such as sensor data (e.g., a video clip and/or an audio clip), a header, compressed data, and/or UE location information. As one example, the second portion of the information may include un-transmitted sensor data associated with the first portion of information, such as sensor data analyzed to generate the first portion of the information (e.g., a metric) but not transmitted with the first portion of the information. Alternatively or additionally, the second portion of information may include header information (e.g., not transmitted with the first portion of the information) that characterizes the sensor data, such as time stamp information, location information, sensor identifiers, one or more metrics not transmitted with the first portion of the information, UE identifiers, and/or other data associated with the first portion of information but not transmitted with the first portion of information. In some aspects, the UE 120 may transmit the second portion of the information based at least in part on receiving the request (e.g., the acknowledge indication or the dynamic resource grant) and the one or more reporting criteria as described with regard to the reference number 430. In some aspects, the base station 110 may forward the second portion of the information to a central server and/or application (not shown in FIG. 4) as further described with regard to FIG. 6.

By receiving a first periodic resource grant, a UE (e.g., the UE 120) may provide a network entity with periodic reports that indicate whether or not the UE has captured relevant information (e.g., sensor data that indicates an anomaly, sensor data that captures movement, and/or sensor data that captures an object absent in prior sensor data). The periodic reports may reduce resource utilization by the UE in the wireless network because the UE may transmit metrics to the network entity that use fewer resources relative to transmitting sensor data. The UE may also refrain from transmitting sensor data over the wireless network until receiving a request for the sensor data, which also preserves the air interface resources for other devices and/or other communications. Assigning the preserved air interface resources to other devices helps improve data throughput in the wireless network and/or helps increase a quantity of devices that the wireless network can support. Further, the UE may receive the second resource grant with less time delay relative to baseline communications, thus decreasing data-transfer latencies.

As indicated above, FIG. 4 is provided as an example. Other examples may differ from what is described with regard to FIG. 4.

Figure 5:
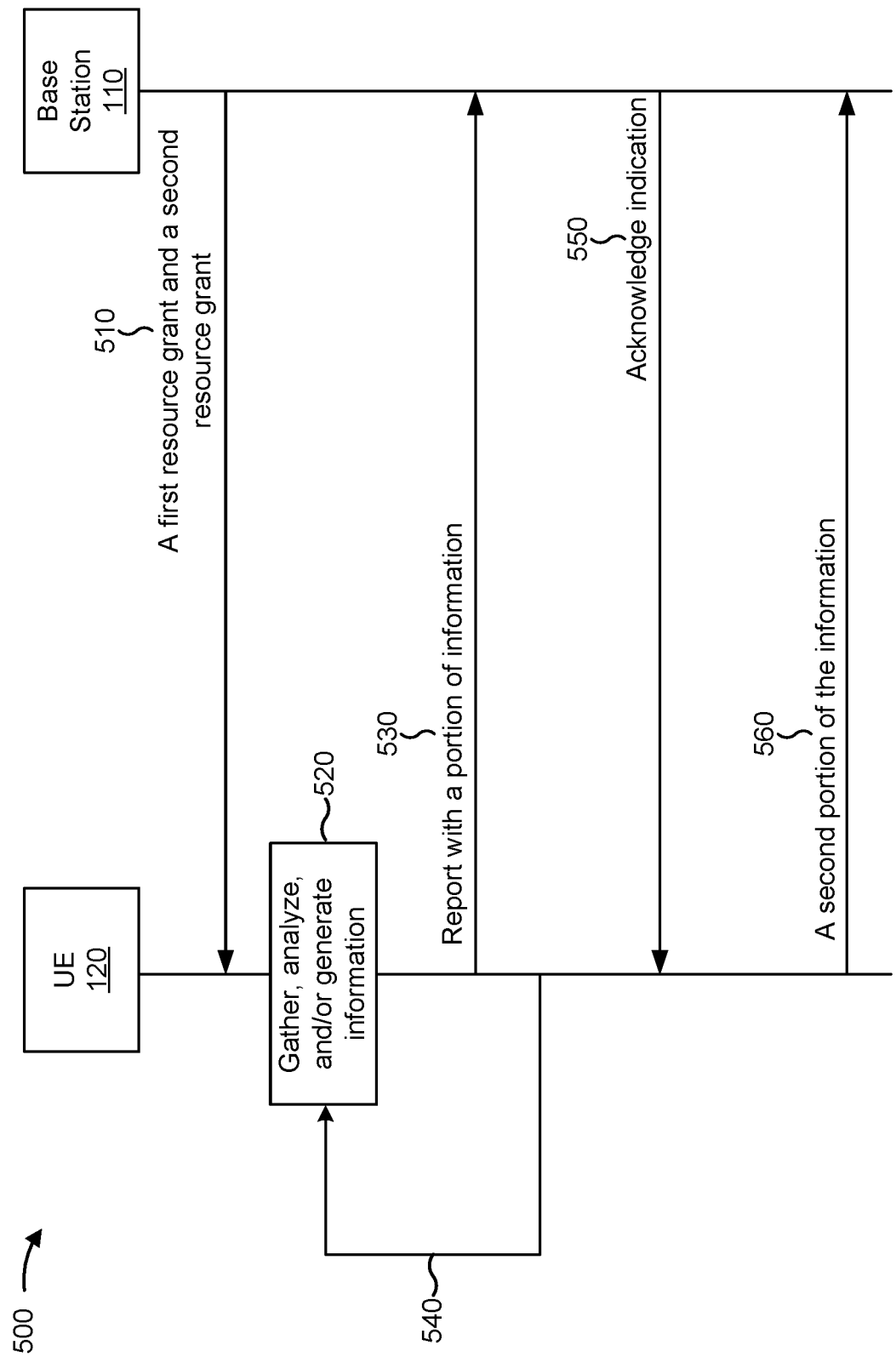
FIG. 5 is a diagram illustrating an example of a communication process between a base station and a UE in a wireless network, in accordance with the present disclosure.

FIG. 5 is a diagram illustrating an example 500 of a communication process between a base station 110 and a UE 120 in a wireless network 100 in accordance with the present disclosure. While the example 500 shows the base station 110 participating in the communication process, alternate or additional network entities may participate, such as a radio unit, a distributed unit, and/or a central unit of a distributed base station.

As shown by reference number 510, the base station 110 may transmit, and the UE 120 may receive, a first indication of a first resource grant and a second indication of a second resource grant. The first resource grant and/or the second resource grant may be periodic resource grants and/or configured grants. In some aspects, the base station 110 may transmit the first indication of the first resource grant together with the second indication of the second resource grant. Similar to that described with regard to FIG. 4, the first resource grant may be a CG-PUSCH. Alternatively or additionally, the second resource grant may be associated with one or more PUSCH resources. In some aspects, the base station 110 may transmit both the first resource grant and the second resource grant in an RRC message, such as an RRC configuration message or an RRC reconfiguration message.

A transmission scheme associated with the second resource grant may be based at least in part on the first resource grant. To illustrate, the first resource grant may have a first periodicity and the second resource grant may have a second periodicity that is derivable from the first periodicity. The second periodicity, for instance, may correspond to N times the first periodicity where N is an integer value. As another example, a frequency resource and/or a time resource associated with the second resource grant may be derivable from a frequency resource and/or a time resource associated with the first resource grant, such as the second resource grant having a same frequency and/or time resource associated with the first resource grant, the second resource grant having an integer multiple of the frequency and/or time resource associated with the first resource grant, and/or the second resource grant having an integer multiple of a bandwidth associated with the first resource grant. Additionally, or alternatively, a frequency resource of the second resource grant may have a frequency offset (e.g., a fixed number of resource blocks, sub-carriers, or other frequency domain resources) from a frequency resource of the first resource grant, and/or a time resource of the second resource grant may have a time offset (e.g., a fixed number of slots or other time domain resources) from a time resource of the first resource grant.

As shown by reference number 520, and similar to that described with regard to FIG. 4, the UE 120 may gather, analyze, and/or generate information. To illustrate, the UE may gather sensor data from one or more sensors, may analyze the sensor data using one or more algorithms (e.g., a machine learning algorithm, a model trained based at least in part on a machine learning algorithm, and/or TinyML), and/or may generate one or more metrics based at least in part on analyzing the sensor data.

As shown by reference number 530, and similar to that described with regard to FIG. 4, the UE 120 may transmit, and the base station 110 may receive, a report that includes a portion of the information. For example, the UE 120 may transmit one or more metrics, a header, and/or UE location information. In some aspects, the UE 120 may transmit the report and/or the portion of the information based at least in part on one or more reporting criteria.

As shown by reference number 540, and similar to that described with regard to FIG. 4, the UE 120 may iteratively gather, analyze, and/or generate information as shown by the reference number 520, and may iteratively transmit a report that includes the portion of the information to the base station as shown by the reference number 530. However, in some aspects, the UE 120 may only transmit the report with the portion of information based at least in part on a reporting condition as further described.

As shown by reference number 550, and similar to that described with regard to FIG. 4, the base station 110 may transmit, and the UE 120 may receive, an acknowledge indication. In some aspects, the acknowledge indication may implicitly specify a request that the UE 120 transmit a second portion of the information based at least in part on the first portion information.

As shown by reference number 560, the UE 120 may transmit, and the base station 110 may receive, a second portion of the information. In some aspects, the second portion of the information may include un-transmitted sensor data associated with the first portion of information, such as sensor data analyzed to generate the first portion of the information (e.g., a metric) but not transmitted with the first portion of the information. Alternatively or additionally, the second portion of information may include header information (e.g., not transmitted with the first portion of the information) that characterizes the sensor data, such as time stamp information, location information, sensor identifiers, one or more metrics not transmitted with the first portion of the information, UE identifiers, and/or other data associated with the first portion of information but not transmitted with the first portion of information. In some aspects, the UE 120 transmits the second portion of the information using the second resource grant indicated in a same transmission as the first resource grant and as shown by the reference number 510.

Using the second resource grant indicated in a same transmission as the first resource grant enables a UE (e.g., the UE 120) to transmit the second portion of information to the base station 110 with less time delay relative to the baseline communication of the example 300 and reduce data-transfer latencies in the wireless network. Receiving a first periodic resource grant together with the second periodic resource grant also provides the UE with a mechanism to communicate reports that indicate when the UE has (or has not) identified information of interest (e.g., anomalies and/or detected objects). The periodic transmissions and analysis by the UE may help reduce an amount of air interface resources utilized by the UE by reducing an amount of information transmitted in the report (e.g., a bit-field relative to a video clip) and/or by reducing the transmission of information defined as not being of interest. Assigning the preserved air interface resources to other devices helps improve data throughput in the wireless network, helps reduce data-transfer latencies in the wireless network, and/or helps increase a quantity of devices that the wireless network can support.

As indicated above, FIG. 5 is provided as an example. Other examples may differ from what is described with regard to FIG. 5.

Figure 6:
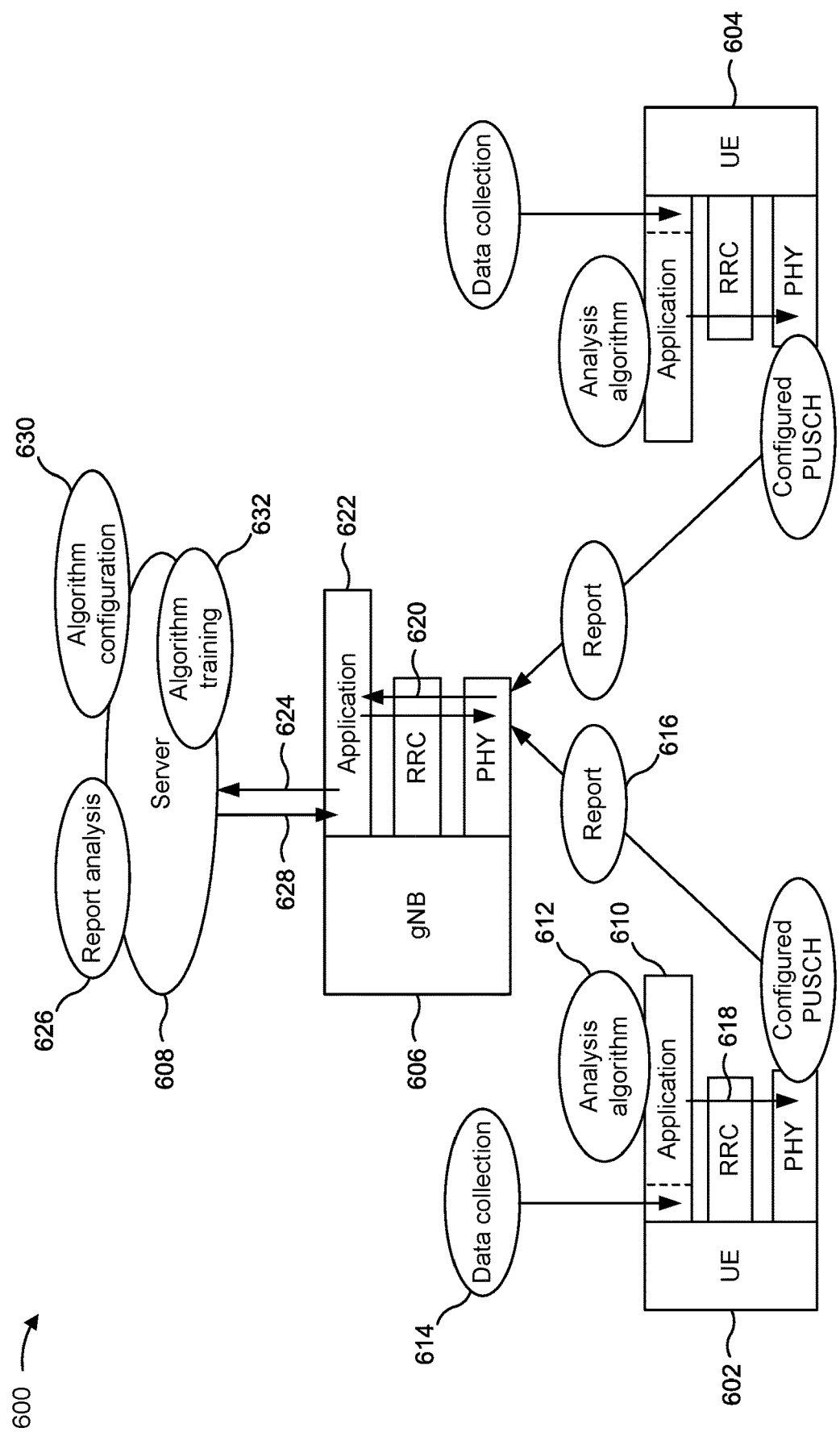
FIG. 6 is a diagram illustrating an example of a system that may use aspects of efficient reporting with remote devices, in accordance with the present disclosure.

FIG. 6 is a diagram illustrating an example 600 of a system that may use aspects of efficient reporting with remote devices, in accordance with the present disclosure. The example 600 includes a first UE 602 (e.g., the UE 120 or the apparatus 900), a second UE 604 (e.g., another UE 120 or another apparatus 900), a base station 606 (e.g., the base station 110 or the apparatus 1000), and a server 608 that is in communication with the base station 606. In some aspects, the server 608 and the base station 606 may be co-located. While the example 600 shows a singular base station, the base station may include alternate or additional network entities. Further, while the example 600 includes two UEs, any number of UEs may be included in the system. The UE 602 and the UE 604 may be considered edge computing devices. In some aspects, the UE 602 and the UE 604 may include similar functionality. Accordingly, the following description with regard to UE 602 may be applicable to the UE 604.

The UE 602 may include an application 610 that processes information based at least in part on an analysis algorithm 612. In one example, the analysis algorithm 612 may be a machine learning algorithm and/or a model (e.g., trained based at least in part on a machine learning algorithm) that processes sensor data to identify information of interest. Example machine learning algorithms include a supervised learning algorithm, an unsupervised learning algorithm, a regression algorithm, a decision tee algorithm, and a random forest algorithm. The application 610 may receive a data collection 614 as input, such as sensor data from a sensor (e.g., a camera, a microphone, a motion sensor) integrated into and/or communicatively coupled to the UE 602. The analysis algorithm 612 may analyze the sensor data to generate various information associated with the sensor data, such as metrics as further described. In some aspects, the application 610 may initiate transmission of a report 616 to the base station 606. As one example, and as shown by reference number 618, the application 612 may initiate transmission of the report 616 to the base station 608, where a configured PUSCH carries the report 616.

The base station 606 may receive the report 616 based at least on part on recovering transmissions received via PUSCH as shown by reference number 620. In some aspects, the base station 606 may route the report 616 to an application 622 executing on the base station 606 and/or to the server 608 as shown by reference number 624.

The server 608 may include one or more applications that process information received from the UE 602 and/or the UE 604. As one example, the server 608 may include a report analysis module 626 that determines whether the report 616 indicates that a UE has identified information of interest. In some aspects, the report analysis module 626 may initiate transmission of a request for additional information as shown by reference number 628.

In some aspects, the server 608 may include an algorithm configuration module 630 that configures the UE 602 and/or the UE 604. For example, and as also shown by the reference number 628, the algorithm configuration module 628 may direct the base station 606 to assign a first resource grant (e.g., a periodic resource grant) and/or a second resource grant to the UE 602 and/or the UE 604. Alternatively or additionally, the algorithm configuration module 630 may instruct the base station 606 to communicate reporting criteria, reporting thresholds, and/or definitions for information of interest to the application 610 resident at the UE 602 and/or the UE 604.

In some aspects, the server 608 may include an algorithm training module 632 that trains a machine learning algorithm. As one example, the algorithm training module 632 may train the machine learning algorithm based at least in part on information received from the UE 602 and/or the UE 604, such as by training the machine learning algorithm using sensor data and metrics as feedback.

The system shown by the example 600 may be considered a distributed system that includes a central node (e.g., the server 608) connected to edge computing devices (e.g., the UE 602, the UE 604) through a wireless network provided at least in part by the base station 606. For instance, the system may be considered a video surveillance system and/or a sensor network in which each edge computing device includes and/or is communicatively coupled to a sensor (e.g., a video camera, a motion detector, a microphone). In some aspects, the edge computing devices may use respective analysis algorithms (e.g., the analysis algorithm module 612) to filter and/or suppress information such that the information is not provided to the central node, such as information that is defined as not being of interest to the central node. As one example, the analysis algorithm module 612 may use definitions received from the server 608 to selectively filter the data collection 614 from the server 608 when the data collection 614 lacks information of interest and/or notify the server 608 when the data collection 614 includes information of interest.

The system as shown by the example 600 may reduce transmissions between a UE and a base station, which helps preserve the air interface resources for other devices operating in the wireless network. Assigning the preserved air interface resources to other devices may help improve data throughput in the wireless network, may reduce other data-transfer latencies in the wireless network, and/or may increase a quantity of devices supportable by the wireless network. Refraining from transmitting the second portion of information may also preserve a battery life of the UE 120 by reducing power consumed by the UE.

As indicated above, FIG. 6 is provided as an example. Other examples may differ from what is described with regard to FIG. 6.

Figure 7:
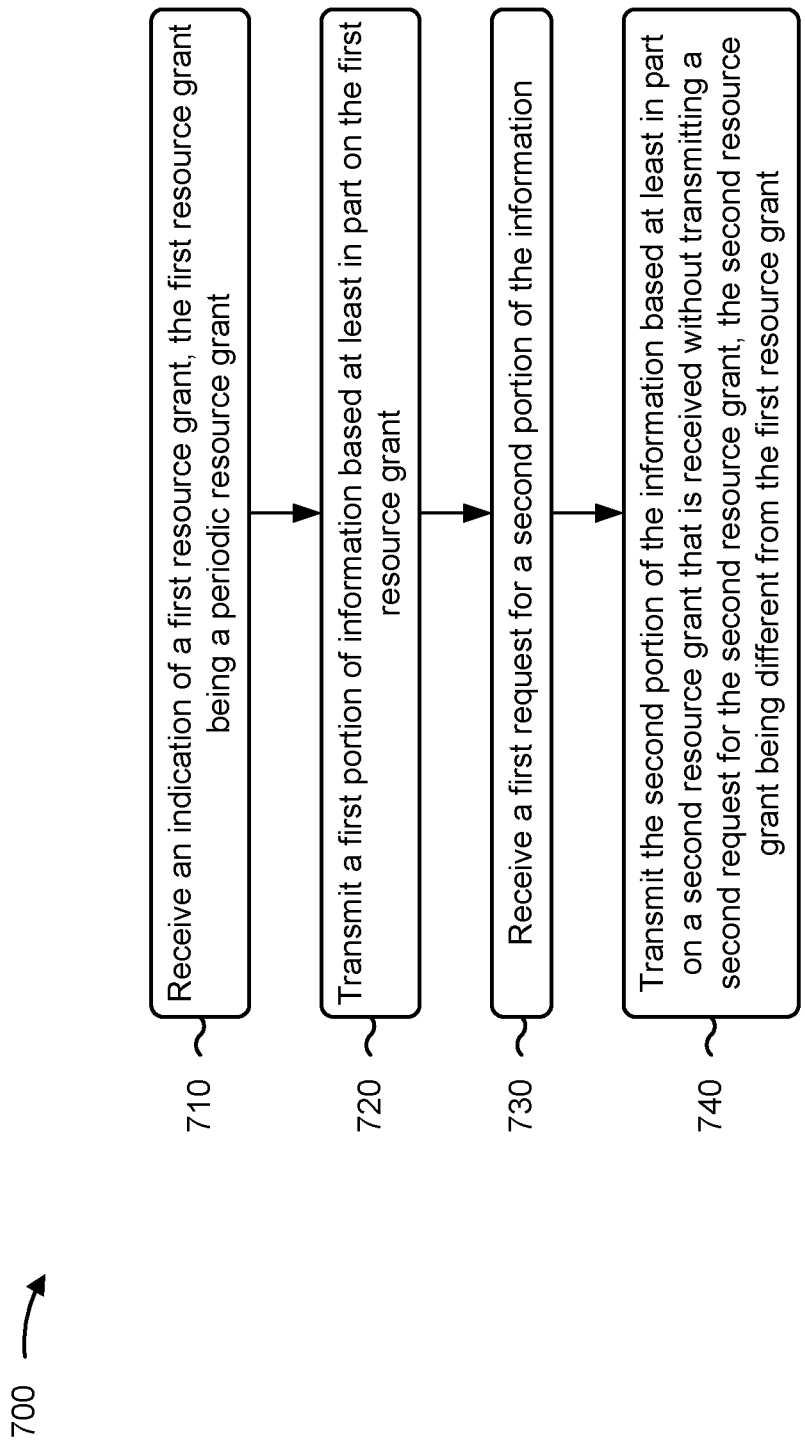
FIG. 7 is a diagram illustrating an example process associated with a UE, in accordance with the present disclosure.

FIG. 7 is a diagram illustrating an example process 700 performed, for example, by a UE, in accordance with the present disclosure. Example process 700 is an example where the UE (e.g., UE 120) performs operations associated with efficient report configuration for remote devices.

As shown in FIG. 7, in some aspects, process 700 may include receiving an indication of a first resource grant, the first resource grant being a periodic resource grant (block 710). For example, the UE (e.g., using communication manager 140 and/or reception component 902, depicted in FIG. 9) may receive an indication of a first resource grant, the first resource grant being a periodic resource grant, as described above.

As further shown in FIG. 7, in some aspects, process 700 may include transmitting a first portion of information based at least in part on the first resource grant (block 720). For example, the UE (e.g., using communication manager 140 and/or transmission component 904, depicted in FIG. 9) may transmit a first portion of information based at least in part on the first resource grant, as described above.

As further shown in FIG. 7, in some aspects, process 700 may include receiving a first request for a second portion of the information (block 730). For example, the UE (e.g., using communication manager 140 and/or reception component 902, depicted in FIG. 9) may receive a first request for a second portion of the information, as described above.

As further shown in FIG. 7, in some aspects, process 700 may include transmitting the second portion of the information based at least in part on a second resource grant that is received without transmitting a second request for the second resource grant, the second resource grant being different from the first resource grant (block 740). For example, the UE (e.g., using communication manager 140 and/or transmission component 904, depicted in FIG. 9) may transmit the second portion of the information based at least in part on a second resource grant that is received without transmitting a second request for the second resource grant, the second resource grant being different from the first resource grant, as described above.

Aspects of the process 700 help preserve air interface resources of a wireless network for other devices. Assigning the preserved air interface resources to other devices may help improve data throughput in the wireless network, may reduce other data-transfer latencies in the wireless network, and/or may increase a quantity of devices supportable by the wireless network. Reducing transmissions by the UE may also preserve a battery life of the UE by reducing power consumed by the UE.

Process 700 may include additional aspects, such as any single aspect or any combination of aspects described below and/or in connection with one or more other processes described elsewhere herein.

In a first aspect, process 700 includes receiving the second resource grant after receiving the first request for the second portion of the information.

In a second aspect, alone or in combination with the first aspect, the second resource grant is a dynamic grant.

In a third aspect, alone or in combination with one or more of the first and second aspects, process 700 includes selecting the first portion of the information based at least in part on analyzing the information. By analyzing the information, the UE may determine to transmit a smaller portion relative to all of the information, thus preserving air interface resources and preserving a battery life of the UE.

In a fourth aspect, alone or in combination with one or more of the first through third aspects, process 700 includes determining to transmit the first portion of the information based at least in part on one or more reporting criteria.

In a fifth aspect, alone or in combination with one or more of the first through fourth aspects, the one or more reporting criteria comprise at least one of detecting an anomaly based at least in part on analyzing the information, or detecting an object based at least in part on analyzing the information.

In a sixth aspect, alone or in combination with one or more of the first through fifth aspects, transmitting the second portion of the information further comprises transmitting the second portion of the information based at least in part on receiving the first request for the second portion of the information, and the one or more reporting criteria.

In a seventh aspect, alone or in combination with one or more of the first through sixth aspects, the indication of the first resource grant is a first indication, and wherein the method further comprises receiving a second indication of the second resource grant with the first indication. Receiving the second indication of the second resource grant with the first indication of the first resource grant helps reduce a data transfer latency of transmissions between the UE and a network entity, which improves a reliability of transmitting time-sensitive information on time.

In an eighth aspect, alone or in combination with one or more of the first through seventh aspects, the second resource grant is a periodic resource grant.

In a ninth aspect, alone or in combination with one or more of the first through eighth aspects, process 700 includes determining a transmission scheme for the second resource grant based at least in part on the first resource grant.

In a tenth aspect, alone or in combination with one or more of the first through ninth aspects, the first resource grant is based at least in part on a CG-PUSCH configuration.

In an eleventh aspect, alone or in combination with one or more of the first through tenth aspects, the second resource grant is for a PUSCH resource.

In a twelfth aspect, alone or in combination with one or more of the first through eleventh aspects, receiving the first request for the second portion of the information further comprises receiving an acknowledge indication based at least in part on transmitting the first portion of the information, the acknowledge indication specifying the first request for the second portion of the information.

In a thirteenth aspect, alone or in combination with one or more of the first through twelfth aspects, receiving the acknowledge indication further comprises receiving the acknowledge indication in DCI that indicates the second resource grant. Receiving the acknowledge indication with the second resource grant reduce a data transfer latency of transmissions between the UE and a network entity, which improves a reliability of transmitting time-sensitive information on time.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
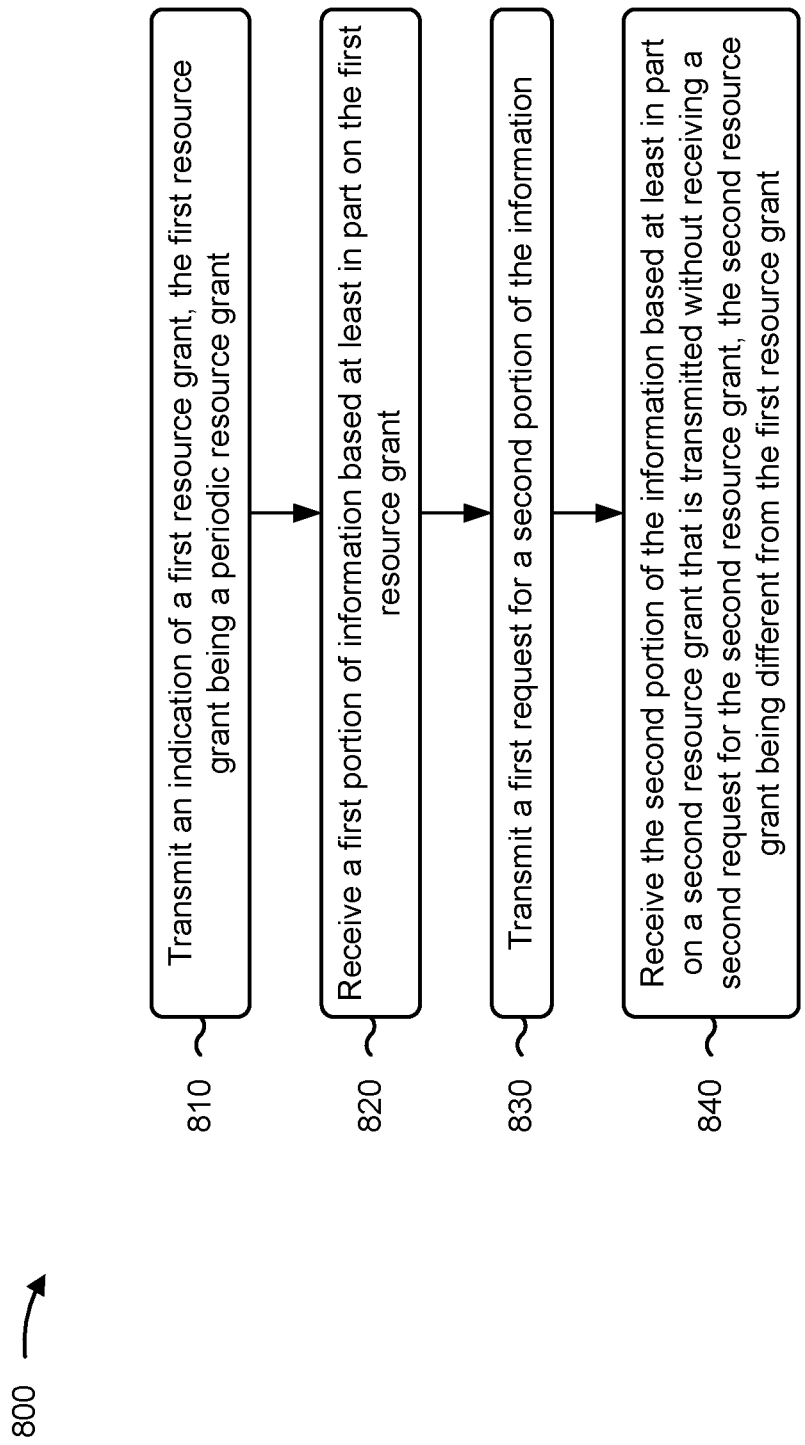
FIG. 8 is a diagram illustrating an example process associated with a network entity, in accordance with the present disclosure.

FIG. 8 is a diagram illustrating an example process 800 performed, for example, by a network entity, in accordance with the present disclosure. Example process 800 is an example where the network entity (e.g., the base station 110, the apparatus 1000, a central unit, a distributed unit, a radio unit, or a combination thereof) performs operations associated with efficient report configuration for remote devices.

As shown in FIG. 8, in some aspects, process 800 may include transmitting an indication of a first resource grant, the first resource grant being a periodic resource grant (block 810). For example, the network entity (e.g., using communication manager 150 and/or transmission component 1004, depicted in FIG. 10) may transmit an indication of a first resource grant, the first resource grant being a periodic resource grant, as described above.

As further shown in FIG. 8, in some aspects, process 800 may include receiving a first portion of information based at least in part on the first resource grant (block 820). For example, the network entity (e.g., using communication manager 150 and/or reception component 1002, depicted in FIG. 10) may receive a first portion of information based at least in part on the first resource grant, as described above.

As further shown in FIG. 8, in some aspects, process 800 may include transmitting a first request for a second portion of the information (block 830). For example, the network entity (e.g., using communication manager 150 and/or transmission component 1004, depicted in FIG. 10) may transmit a first request for a second portion of the information, as described above.

As further shown in FIG. 8, in some aspects, process 800 may include receiving the second portion of the information based at least in part on a second resource grant that is transmitted without receiving a second request for the second resource grant, the second resource grant being different from the first resource grant (block 840). For example, the network entity (e.g., using communication manager 150 and/or reception component 1002, depicted in FIG. 10) may receive the second portion of the information based at least in part on a second resource grant that is transmitted without receiving a second request for the second resource grant, the second resource grant being different from the first resource grant, as described above.

Aspects of the process 800 help preserve air interface resources of a wireless network for other devices. Assigning the preserved air interface resources to other devices may help improve data throughput in the wireless network, may reduce other data-transfer latencies in the wireless network, and/or may increase a quantity of devices supportable by the wireless network. Reducing transmissions by the UE may also preserve a battery life of the UE by reducing power consumed by the UE.

Process 800 may include additional aspects, such as any single aspect or any combination of aspects described below and/or in connection with one or more other processes described elsewhere herein.

In a first aspect, the indication of the first resource grant is a first indication, and the method further comprises transmitting a second indication of the second resource grant after transmitting the first request for the second portion of the information.

In a second aspect, alone or in combination with the first aspect, the second resource grant is a dynamic grant.

In a third aspect, alone or in combination with one or more of the first and second aspects, the first portion of the information indicates at least one of detection of an anomaly, or detection of an object.

In a fourth aspect, alone or in combination with one or more of the first through third aspects, the indication of the first resource grant is a first indication, and the method further comprises transmitting a second indication of the second resource grant with the first indication.

In a fifth aspect, alone or in combination with one or more of the first through fourth aspects, the second resource grant is a periodic resource grant.

In a sixth aspect, alone or in combination with one or more of the first through fifth aspects, the first resource grant is based at least in part on a CG-PUSCH configuration.

In a seventh aspect, alone or in combination with one or more of the first through sixth aspects, the second resource grant is for a PUSCH resource.

In an eighth aspect, alone or in combination with one or more of the first through seventh aspects, transmitting the first request for the second portion of the information further comprises transmitting an acknowledge indication based at least in part on receiving the first portion of the information, the acknowledge indication specifying the first request for the second portion of the information.

In a ninth aspect, alone or in combination with one or more of the first through eighth aspects, transmitting the acknowledge indication further comprises transmitting the acknowledge indication in DCI that indicates the second resource grant. Transmitting the acknowledge indication with the second resource grant reduce a data transfer latency of transmissions between the UE and a network entity, which improves a reliability of transmitting time-sensitive information on time.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
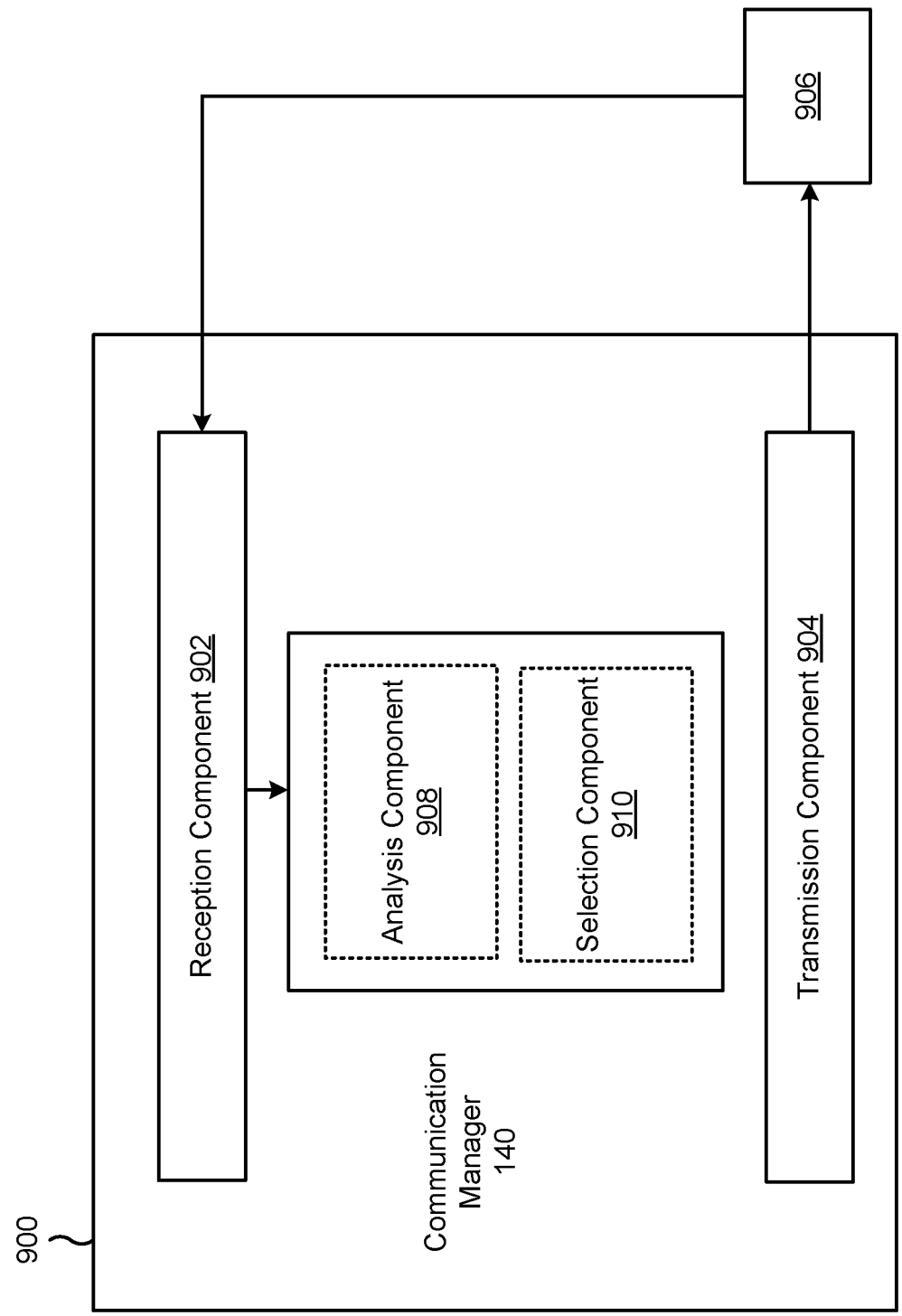
FIG. 9 is a diagram of an example apparatus for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of an analysis component 908 or a selection component 910, among other examples.

In some aspects, the apparatus 900 may be configured to perform one or more operations described herein in connection with FIG. 4-8. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The analysis component 908 may receive input information, such as sensor data, and analyze the sensor data to determine if the input information is of interest. As one example, the analysis component 908 analyzes the input information based at least in part on one or more definitions of input of interests as further described elsewhere herein. In some aspects, the analysis computing 908 may generate one or more metrics associated with the input information.

The selection component 910 may select portions of information to send to a network entity. For example, the selection component 910 may select a first portion of information to send to the network entity based at least in part on an analysis performed by the analysis component 908. Alternatively or additionally, the selection component 910 may select a second portion of information to send to the network entity based at least in part on receiving a request for the second portion of information.

The reception component 902 may receive an indication of a first resource grant, the first resource grant being a periodic resource grant. The transmission component 904 may transmit a first portion of information based at least in part on the first resource grant. The reception component 902 may receive a first request for a second portion of the information. The transmission component 904 may transmit the second portion of the information based at least in part on a second resource grant that is received without transmitting a second request for the second resource grant, the second resource grant being different from the first resource grant.

The reception component 902 may receive the second resource grant after receiving the first request for the second portion of the information.

The selection component 910 may select the first portion of the information based at least in part on the analysis component 908 analyzing the information.

The selection component 910 may determine to transmit the first portion of the information based at least in part on one or more reporting criteria.

The transmission component 904 may determine a transmission scheme for the second resource grant based at least in part on the first resource grant.

Figure 10:
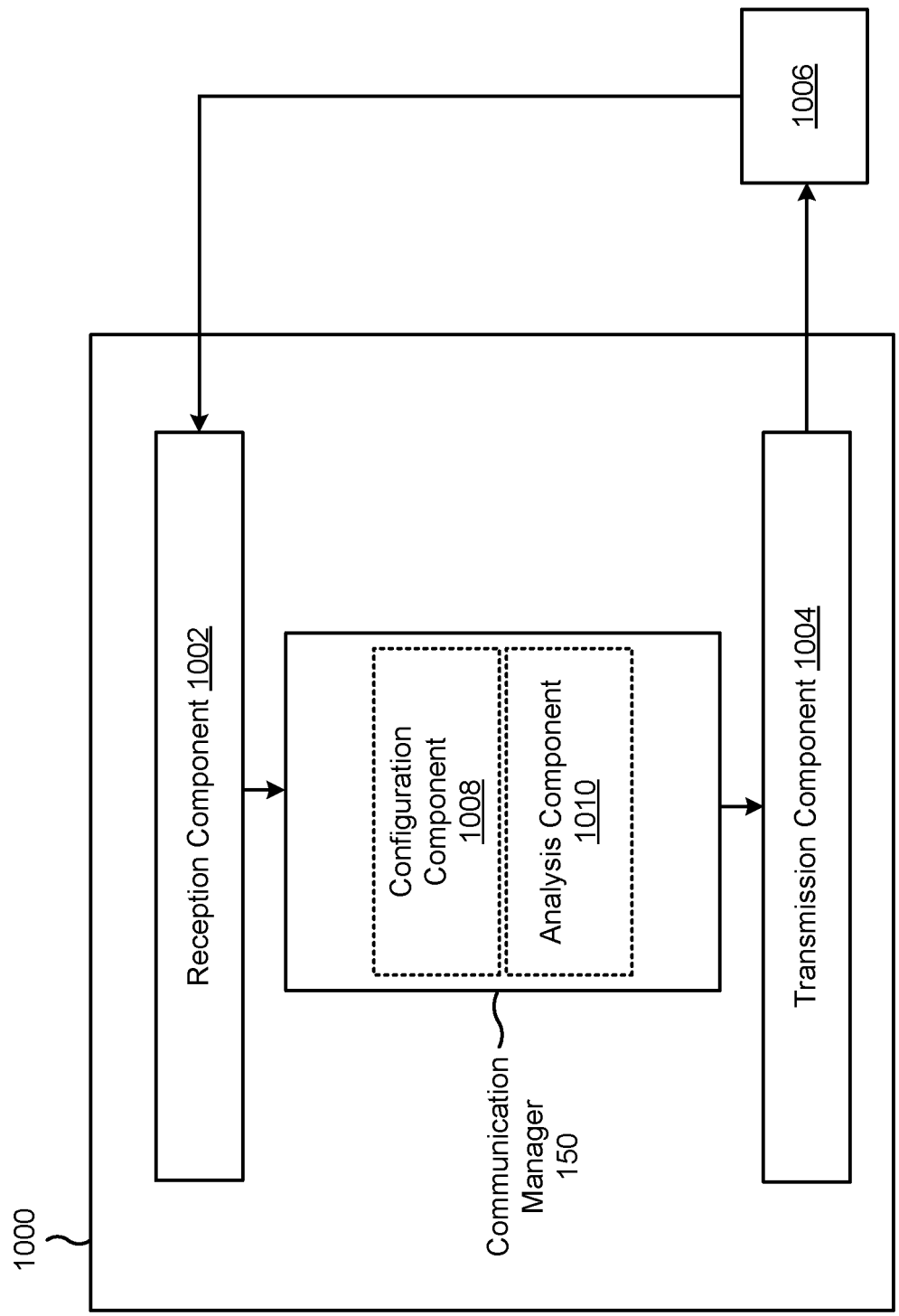
FIG. 10 is a diagram of an example apparatus for wireless communication, in accordance with the present disclosure.

FIG. 10 is a diagram of an example apparatus 1000 for wireless communication. The apparatus 1000 may be a network entity, or a network entity may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150) may include one or more of a configuration component 1008, or an analysis component 1010, among other examples.

In some aspects, the apparatus 1000 may be configured to perform one or more operations described herein in connection with FIGS. 4-8. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network entity described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network entity described in connection with FIG. 2. In some aspects, the reception component 1002 may be coupled to a radio communication component, which may include one or more antennas, a modem, a demodulator, a MIMO detector, a receive processor, a controller/processor, a memory, or a combination thereof, of the network entity described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network entity described in connection with FIG. 2. In some aspects, the transmission component 1004 may be co-located with the reception component 1002 in a transceiver. In some aspects, the transmission component 1004 may be coupled with a radio communication component, which include one or more antennas, a modem, a modulator, a transmit MIMO processor, a transmit processor, a controller/processor, a memory, or a combination thereof, of the network entity described in connection with FIG. 2.

The transmission component 1004 may transmit an indication of a first resource grant, the first resource grant being a periodic resource grant. The reception component 1002 may receive a first portion of information based at least in part on the first resource grant. The transmission component 1004 may transmit a first request for a second portion of the information. The reception component 1002 may receive the second portion of the information based at least in part on a second resource grant that is transmitted without receiving a second request for the second resource grant, the second resource grant being different from the first resource grant.

The configuration component 1008 may select a configuration for the first resource grant and/or the second resource grant.

The analysis component 1010 may determine whether to request a second portion of information based at least in part on analyzing a first portion of information received from a UE.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving an indication of a first resource grant, the first resource grant being a periodic resource grant; transmitting a first portion of information based at least in part on the first resource grant; receiving a first request for a second portion of the information; and transmitting the second portion of the information based at least in part on a second resource grant that is received without transmitting a second request for the second resource grant, the second resource grant being different from the first resource grant.

Aspect 2: The method of Aspect 1, further comprising: receiving the second resource grant after receiving the first request for the second portion of the information.

Aspect 3: The method of Aspect 2, wherein the second resource grant is a dynamic grant.

Aspect 4: The method of any one of Aspects 1-3, further comprising: selecting the first portion of the information based at least in part on analyzing the information.

Aspect 5: The method of any one of Aspects 1-4, further comprising: determining to transmit the first portion of the information based at least in part on one or more reporting criteria.

Aspect 6: The method of Aspect 5, wherein the one or more reporting criteria comprise at least one of: detecting an anomaly based at least in part on analyzing the information, or detecting an object based at least in part on analyzing the information.

Aspect 7: The method of Aspect 5, wherein transmitting the second portion of the information further comprises: transmitting the second portion of the information based at least in part on: receiving the first request for the second portion of the information, and the one or more reporting criteria.

Aspect 8: The method of any one of Aspects 1, wherein the indication of the first resource grant is a first indication, and wherein the method further comprises: receiving a second indication of the second resource grant with the first indication.

Aspect 9: The method of any one of Aspects 8, wherein the second resource grant is a periodic resource grant.

Aspect 10: The method of Aspect 9, further comprising: determining a transmission scheme for the second resource grant based at least in part on the first resource grant.

Aspect 11: The method of any one of Aspects 1-10, wherein the first resource grant is based at least in part on a configured grant (CG) physical uplink shared channel (PUSCH) configuration.

Aspect 12: The method of Aspect 11, wherein the second resource grant is for a physical uplink shared channel (PUSCH) resource.

Aspect 13: The method of Aspect 12, wherein receiving the first request for the second portion of the information further comprises: receiving an acknowledge indication based at least in part on transmitting the first portion of the information, the acknowledge indication specifying the first request for the second portion of the information.

Aspect 14: The method of Aspect 13, wherein receiving the acknowledge indication further comprises: receiving the acknowledge indication in downlink control information (DCI) that indicates the second resource grant.

Aspect 15: A method of wireless communication performed by a network entity, comprising: transmitting an indication of a first resource grant, the first resource grant being a periodic resource grant; receiving a first portion of information based at least in part on the first resource grant; transmitting a first request for a second portion of the information; and receiving the second portion of the information based at least in part on a second resource grant that is transmitted without receiving a second request for the second resource grant, the second resource grant being different from the first resource grant.

Aspect 16: The method of Aspect 15, wherein the indication of the first resource grant is a first indication, and the method further comprises: transmitting a second indication of the second resource grant after transmitting the first request for the second portion of the information.

Aspect 17: The method of Aspect 16, wherein the second resource grant is a dynamic grant.

Aspect 18: The method of any one of Aspects 15-17, wherein the first portion of the information indicates at least one of: detection of an anomaly, or detection of an object.

Aspect 19: The method of Aspect 15, wherein the indication of the first resource grant is a first indication, and the method further comprises: transmitting a second indication of the second resource grant with the first indication.

Aspect 20: The method of Aspect 19, wherein the second resource grant is a periodic resource grant.

Aspect 21: The method of any one of Aspects 15-19, wherein the first resource grant is based at least in part on a configured grant (CG) physical uplink shared channel (PUSCH) configuration.

Aspect 22: The method of any one of Aspects 15-21, wherein the second resource grant is for a physical uplink shared channel (PUSCH) resource.

Aspect 23: The method of any one of Aspects 15-22, wherein transmitting the first request for the second portion of the information further comprises: transmitting an acknowledge indication based at least in part on receiving the first portion of the information, the acknowledge indication specifying the first request for the second portion of the information.

Aspect 24: The method of Aspect 23, wherein transmitting the acknowledge indication further comprises: transmitting the acknowledge indication in downlink control information (DCI) that indicates the second resource grant.

Aspect 25: An apparatus for wireless communication at a device, comprising a processor; memory coupled with the processor; and instructions stored in the memory and executable by the processor to cause the apparatus to perform the method of one or more of Aspects 1-14.

Aspect 26: A device for wireless communication, comprising a memory and one or more processors coupled to the memory, the one or more processors configured to perform the method of one or more of Aspects 15-24.

Aspect 27: An apparatus for wireless communication, comprising at least one means for performing the method of one or more of Aspects 1-14.

Aspect 28: A non-transitory computer-readable medium storing code for wireless communication, the code comprising instructions executable by a processor to perform the method of one or more of Aspects 15-24.

Aspect 29: A non-transitory computer-readable medium storing a set of instructions for wireless communication, the set of instructions comprising one or more instructions that, when executed by one or more processors of a device, cause the device to perform the method of one or more of Aspects 1-24.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
receive an indication of a first resource grant;

transmit a first portion of information based at least in part on the first resource grant;
receive a first request for a second portion of the information; and
transmit the second portion of the information based at least in part on a second resource grant that is received without transmitting a second request for the second resource grant, the second resource grant being different from the first resource grant, wherein the second resource grant is a periodic resource grant or a dynamic grant.

2. The apparatus of claim 1, wherein the one or more processors are further configured to:
receive the second resource grant after receiving the first request for the second portion of the information.

3. The apparatus of claim 1, wherein the one or more processors are further configured to:
select the first portion of the information based at least in part on analyzing the information.

4. The apparatus of claim 1, wherein the one or more processors are further configured to:
determine to transmit the first portion of the information based at least in part on one or more reporting criteria.

5. The apparatus of claim 4, wherein the one or more processors are further configured to:
detect an anomaly based at least in part on analyzing the information, or
detect an object based at least in part on analyzing the information.

6. The apparatus of claim 1, wherein the indication of the first resource grant is a first indication, and wherein the one or more processors are further configured to:
receive a second indication of the second resource grant with the first indication.

7. The apparatus of claim 1, wherein the one or more processors are further configured to:
determine a transmission scheme for the second resource grant based at least in part on the first resource grant.

8. The apparatus of claim 1, wherein the first resource grant is based at least in part on a configured grant (CG) physical uplink shared channel (PUSCH) configuration.

9. The apparatus of claim 1, wherein the second resource grant is for a physical uplink shared channel (PUSCH) resource.

10. The apparatus of claim 1, wherein the one or more processors, to receive the first request for the second portion of the information, are configured to:
receive an acknowledge indication based at least in part on transmitting the first portion of the information, the acknowledge indication specifying the first request for the second portion of the information.

11. The apparatus of claim 10, wherein the one or more processors, to receive the acknowledge indication, are configured to:
receive the acknowledge indication in downlink control information (DCI) that indicates the second resource grant.

12. The apparatus of claim 1, wherein the first resource grant is a configured grant (CG) physical uplink shared channel (PUSCH) or a periodic resource grant.

13. An apparatus for wireless communication at a network entity, comprising:
one or more memories; and
one or more processors, coupled to the one or more memories, configured to:
transmit an indication of a first resource grant;
receive a first portion of information based at least in part on the first resource grant;
transmit a first request for a second portion of the information; and
receive the second portion of the information based at least in part on a second resource grant that is transmitted without receiving a second request for the second resource grant, the second resource grant being different from the first resource grant, wherein the second resource grant is a periodic resource grant or a dynamic grant.

14. The apparatus of claim 13, wherein the one or more processors are further configured to:
transmit a second indication of the second resource grant after transmitting the first request for the second portion of the information.

15. The apparatus of claim 13, wherein the first portion of the information indicates at least one of:
detection of an anomaly, or
detection of an object.

16. The apparatus of claim 13, wherein the indication of the first resource grant is a first indication, and wherein one or more processors are further configured to:
transmit a second indication of the second resource grant with the first indication.

17. The apparatus of claim 13, wherein the first resource grant is based at least in part on a configured grant (CG) physical uplink shared channel (PUSCH) configuration.

18. The apparatus of claim 13, wherein the second resource grant is for a physical uplink shared channel (PUSCH) resource.

19. The apparatus of claim 13, wherein the one or more processors, to transmit the first request for the second portion of the information, are configured to:
transmit an acknowledge indication based at least in part on receiving the first portion of the information, the acknowledge indication specifying the first request for the second portion of the information.

20. The apparatus of claim 19, wherein the one or more processors, to transmit the acknowledge indication, are configured to:
transmit the acknowledge indication in downlink control information (DCI) that indicates the second resource grant.

21. The apparatus of claim 13, wherein the first resource grant is a configured grant (CG) physical uplink shared channel (PUSCH) or a periodic resource grant.

22. A method of wireless communication performed by a user equipment (UE), comprising:
receiving an indication of a first resource grant;
transmitting a first portion of information based at least in part on the first resource grant;
receiving a first request for a second portion of the information; and
transmitting the second portion of the information based at least in part on a second resource grant that is received without transmitting a second request for the second resource grant, the second resource grant being different from the first resource grant, wherein the second resource grant is a periodic resource grant or a dynamic grant.

23. The method of claim 22, wherein the indication is a first indication, and the method further comprises:
receiving a second indication of the second resource grant after receiving the first request for the second portion of the information; or receiving the second indication of the second resource grant with the first indication.

24. The method of claim 22, further comprising:
determining to transmit the first portion of the information based at least in part on one or more reporting criteria.

25. The method of claim 22, wherein receiving the first request for the second portion of the information further comprises:
receiving an acknowledge indication based at least in part on transmitting the first portion of the information, the acknowledge indication specifying the first request for the second portion of the information.

26. The method of claim 22, wherein the first resource grant is a configured grant (CG) physical uplink shared channel (PUSCH) or a periodic resource grant.

27. A method of wireless communication performed by a network entity, comprising:
transmitting an indication of a first resource grant;
receiving a first portion of information based at least in part on the first resource grant;
transmitting a first request for a second portion of the information; and
receiving the second portion of the information based at least in part on a second resource grant that is transmitted without receiving a second request for the second resource grant, the second resource grant being different from the first resource grant, wherein the second resource grant is a periodic resource grant or a dynamic grant.

28. The method of claim 27, wherein the indication of the first resource grant is a first indication, and the method further comprises:
transmitting a second indication of the second resource grant after transmitting the first request for the second portion of the information; or
transmitting the second indication of the second resource grant with the first indication.

29. The method of claim 27, wherein the first portion of the information indicates at least one of:
detection of an anomaly, or
detection of an object.

30. The method of claim 27, wherein transmitting the first request for the second portion of the information further comprises:
transmitting an acknowledge indication based at least in part on receiving the first portion of the information, the acknowledge indication specifying the first request for the second portion of the information.

* * * * *